United States Patent
Lee et al.

(10) Patent No.: US 11,242,635 B2
(45) Date of Patent: Feb. 8, 2022

(54) DRUM WASHING MACHINE

(71) Applicant: SAMSUNG ELECTRONICS CO., LTD., Suwon-si (KR)

(72) Inventors: Jung Hee Lee, Suwon-si (KR); Jeong Hoon Kang, Seoul (KR); Min Sung Kim, Yongin-si (KR); Dong Ha Jung, Yongin-si (KR); Kwan Woo Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/643,162

(22) PCT Filed: Aug. 24, 2018

(86) PCT No.: PCT/KR2018/009832
§ 371 (c)(1),
(2) Date: Feb. 28, 2020

(87) PCT Pub. No.: WO2019/045381
PCT Pub. Date: Mar. 7, 2019

(65) Prior Publication Data
US 2020/0270798 A1    Aug. 27, 2020

(30) Foreign Application Priority Data
Aug. 28, 2017    (KR) .................. 10-2017-0108456

(51) Int. Cl.
*D06F 37/20*    (2006.01)
*F16F 1/373*    (2006.01)
(Continued)

(52) U.S. Cl.
CPC ............ *D06F 37/206* (2013.01); *D06F 21/02* (2013.01); *D06F 37/22* (2013.01); *F16F 1/376* (2013.01);
(Continued)

(58) Field of Classification Search
CPC ........ D06F 37/206; D06F 21/02; D06F 37/22; F16F 1/373; F16F 1/3732; F16F 1/376
See application file for complete search history.

(56) References Cited

U.S. PATENT DOCUMENTS 5,020,767 A * 6/1991 Ueda ..................... D06F 37/206
248/638
6,336,794 B1 * 1/2002 Kim .................... F04B 39/0044
417/363
(Continued)

FOREIGN PATENT DOCUMENTS

DE    10 2006 027 440 B3    5/2007
EP         0 937 807 A1    8/1999
(Continued)

OTHER PUBLICATIONS

Machine translation of DE 102006027440 B3 to MIELE. (Year: 2007).*

(Continued)

*Primary Examiner* — Joseph L. Perrin
(74) *Attorney, Agent, or Firm* — Staas & Halsey, LLP

(57) ABSTRACT

Disclosed herein is a drum washing machine having an improved motor mount structure. The drum washing machine includes a tub having a coupling part; a drum rotatably installed in the tub; a motor bracket installed at the coupling part; and an elastic member having a cylindrical shape and disposed between the motor bracket and the tub, wherein the elastic member comprises a rib protruding in a radial direction from the inner circumferential surface of the elastic member, and the rib has the longest protrusion at a longitudinal center of the elastic member.

15 Claims, 16 Drawing Sheets

(51) Int. Cl.
   *F16F 1/376* (2006.01)
   *D06F 21/02* (2006.01)
   *D06F 37/22* (2006.01)

(52) U.S. Cl.
   CPC ............ *F16F 1/3732* (2013.01); *F16F 1/373* (2013.01); *F16F 2234/02* (2013.01)

(56) References Cited

U.S. PATENT DOCUMENTS

| | | | | |
|---|---|---|---|---|
| 2002/0021655 | A1* | 2/2002 | Shin | G11B 33/08 720/688 |
| 2006/0191301 | A1* | 8/2006 | Park | D06F 37/304 68/140 |
| 2010/0095713 | A1* | 4/2010 | Yim | D06F 39/085 68/19 |
| 2017/0096770 | A1* | 4/2017 | Kim | D06F 39/088 |
| 2018/0258577 | A1* | 9/2018 | Lee | D06F 37/22 |

FOREIGN PATENT DOCUMENTS

| | | |
|---|---|---|
| FR | 1 079 854 A | 12/1954 |
| GB | 2 074 696 A | 11/1981 |
| JP | 2001-235183 | 8/2001 |
| JP | 2013-128634 | 7/2013 |
| KR | 10-0274260 | 9/2000 |
| KR | 10-2002-0013199 A | 2/2002 |
| KR | 10-2005-0095208 | 9/2005 |
| KR | 10-0657921 | 12/2006 |

OTHER PUBLICATIONS

International Search Report dated Dec. 12, 2018 in corresponding International Patent Application No. PCT/KR2018/009832.
Extended European Search Report dated Jun. 9, 2020 in corresponding European Patent Application No. 18852682.6.
Korean Office Action dated Oct. 16, 2021, in Korean Patent Application No. 10-2017-0108456 (15 pages including translation).

* cited by examiner

DRUM WASHING MACHINE

CROSS-REFERENCE TO RELATED APPLICATIONS

This application is a U.S. National Stage Application which claims the benefit under 35 U.S.C. § 371 of International Patent Application No. PCT/KR2018/009832 filed on Aug. 24, 2018, which claims foreign priority benefit under 35 U.S.C. § 119 of Korean Patent Application No. 10-2017-0108456 filed on Aug. 28, 2017 in the Korean Intellectual Property Office, the contents of all of which are incorporated herein by reference.

BACKGROUND

1. Field

The disclosure relates to a drum washing machine having an improved motor mount structure.

2. Description of Related Art

A washing machine is a machine for washing clothes using electric power. The washing machine includes a tub configured to store wash water, a drum rotatably installed inside the tub and configured to receive laundry therein, and a driving device configured to drive rotation of the drum. The laundry is washed by the rotation of the drum by the driving device.

In general, the driving device has an indirect driving type in which the driving force of a driving motor is indirectly transmitted to the drum through a belt wound on a motor pulley and a drum pulley, or a direct driving type in which a driving motor is directly connected to the drum to transmit the driving force directly to the drum.

In a drum washing machine employing the indirect driving type, a motor bracket for fixing the driving motor is coupled to a lower side of the tub. The tub and the motor bracket may be fastened by fastening members such as bolts and nuts.

On the other hand, the force generated during the rotation of the drum by the driving device is transmitted to the tub surrounding the drum and generate vibration.

DISCLOSURE

Technical Problem

Therefore, it is an aspect of the present disclosure to provide a drum washing machine including an improved motor mount structure for reducing vibration and noise.

It is another aspect of the present disclosure to provide a drum washing machine including a motor mount structure capable of improving the durability of a motor by insulation of vibration.

Technical Solution

Additional aspects of the disclosure will be set forth in part in the description which follows and, in part, will be obvious from the description, or may be learned by practice of the disclosure.

In accordance with an aspect of the disclosure, a washing machine includes: a tub having a coupling part; a drum rotatably installed in the tub; a motor bracket installed at the coupling part; and an elastic member having a cylindrical shape and disposed between the motor bracket and the tub, wherein the elastic member comprises a rib protruding in a radial direction from the inner circumferential surface of the elastic member, and the rib has a protruding length that is largest at the longitudinal center of the elastic member.

The motor bracket may include a coupling hole corresponding to the coupling part, and an outer circumferential surface of the elastic member is configured to contact an inner surface of the coupling hole.

The protruding length of the rib may decrease from the center of the elastic member toward an end of the elastic member.

The rib may include a plurality of ribs, and at least two of the plurality of ribs each have a protruding length that increases in the radial direction of the elastic member toward the center of the elastic member.

The plurality of ribs may be disposed to be spaced apart from each other in the circumferential direction.

The rib may include at least one shape of a circle, a rhombus, a rectangle, and a trapezoid.

The elastic member may include: a body; a flange protruding in an outer direction from each of opposite ends of the body; and a protruding portion protruding from the flange.

The protruding portion may be formed in a circumferential direction at edges of the flange.

In accordance with another aspect of the disclosure, a washing machine includes: a tub; a motor bracket configured to fix a motor to the tub; and an elastic member provided between the tub and the motor bracket, wherein the elastic member has a diameter of at least a portion of the inner circumferential surface of the elastic member that is decreases from opposite ends toward a center of the elastic member.

The elastic member may include a cylindrical body and a flange formed at an edge of both ends of the body, and the flange may include a protruding portion protruding from the flange.

The protruding portion may be formed in a circumferential direction on the upper surface of the flange.

The protruding portion may include a section having at least one shape of a circle, a rhombus, a rectangle, and a trapezoid.

In accordance with another aspect of the disclosure, a washing machine includes: a tub; a motor bracket configured to fix a motor to the tub; and an elastic member provided between the tub and the motor bracket, wherein the elastic member may include a rib protruding from an inner circumferential surface of the elastic member in a radial direction of the elastic member, the rib may include a first portion and a second portion located closer to a center C1 of the rib than the first portion is, and one end of the second portion is closer to a center C of the elastic member than one end of the first portion is.

The rib may include a plurality of ribs, and the plurality of ribs may be disposed to be spaced apart from each other in the circumferential direction.

The first portion may have first height shorter than second height of the second portion.

The tub may include at least one coupling part, the motor bracket may include a coupling hole coupled to the coupling part, and the elastic member may be provided between the coupling part and the coupling hole.

The rib may be have a protruding length that is largest at a longitudinal center of the elastic member.

An outer circumferential surface of the elastic member may be formed to contact an inner surface of the coupling hole.

The elastic member may include a flange formed at edges of each of opposite ends and a protruding portion formed in a circumferential direction on the flange.

The protruding portion may include at least one shape of a circle, a rhombus, a rectangle, and a trapezoid.

According to the embodiment of the present disclosure, an improved motor mount structure may reduce vibrations and noise.

The improved motor mount structure may also reduce vibrations along a motor shaft and vibrations of the tub.

It may also improve motor durability.

BRIEF DESCRIPTION OF THE DRAWINGS

The above and/or other aspects will become more apparent by describing in detail embodiments with reference to the accompanying drawings, in which.

DETAILED DESCRIPTION OF EXEMPLARY EMBODIMENTS

Figure 1:
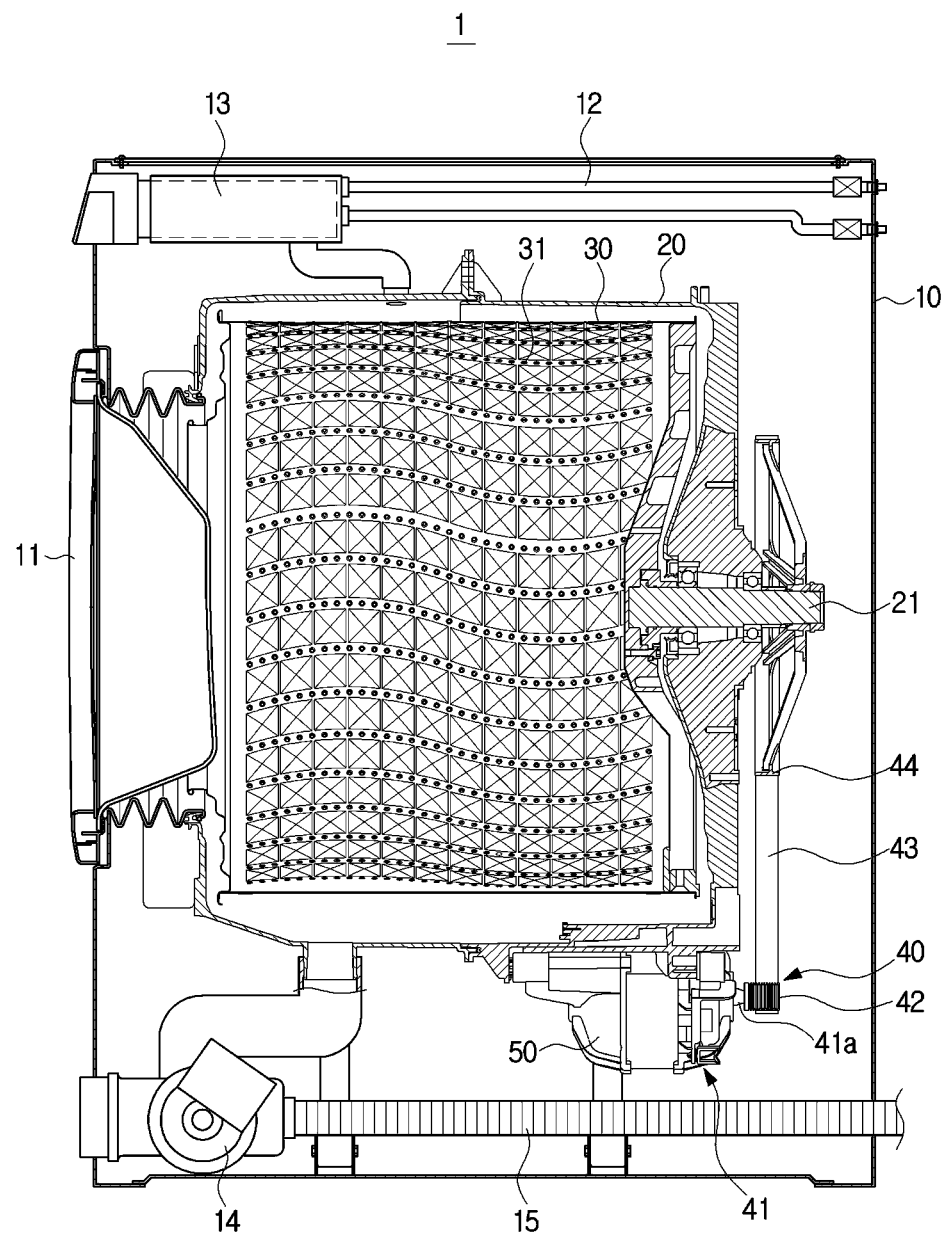
FIG. 1 shows a drum washing machine, according to an embodiment.

Exemplary embodiments described herein and shown in the accompanying drawings are merely examples of the embodiments of the present disclosure, and various modifications may be made to replace the embodiments of the present disclosure at the time of filing.

Throughout the drawings, like reference numerals refer to like parts or components.

The terminology used herein is for the purpose of describing particular embodiments only and is not intended to limit the present disclosure. It is to be understood that the singular forms "a," "an," and "the" include plural references unless the context clearly dictates otherwise. It will be further understood that the terms "comprises," "comprising," "includes," and "including" when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, third, etc., may be used herein to describe various components, these components should not be limited by these terms. These terms are only used to distinguish one component from another. For example, a first component may also be called a second component, while the second component may be called a first component. Descriptions shall be understood as to include any and all combinations of one or more of the associated listed items when the items are described by using the conjunctive term "~ and/or ~," or the like.

Embodiments will now be described more fully with reference to the accompanying drawings. The terms "front end", "rear end", "lower", "upper end" and "lower end" used in the following description are defined with reference to the drawings, and a shape and location of each component are not limited by these terms.

Figure 2:
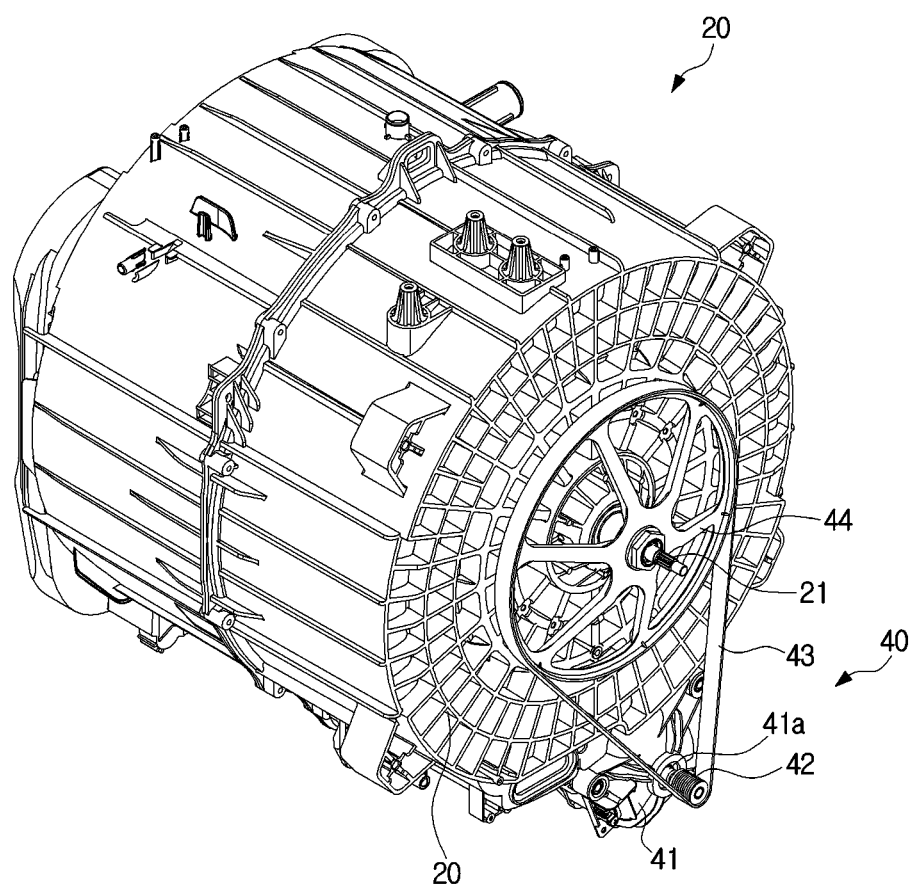
FIG. 2 is a perspective view of a motor installed at a tub of a drum washing machine, according to an embodiment.
Figure 3:
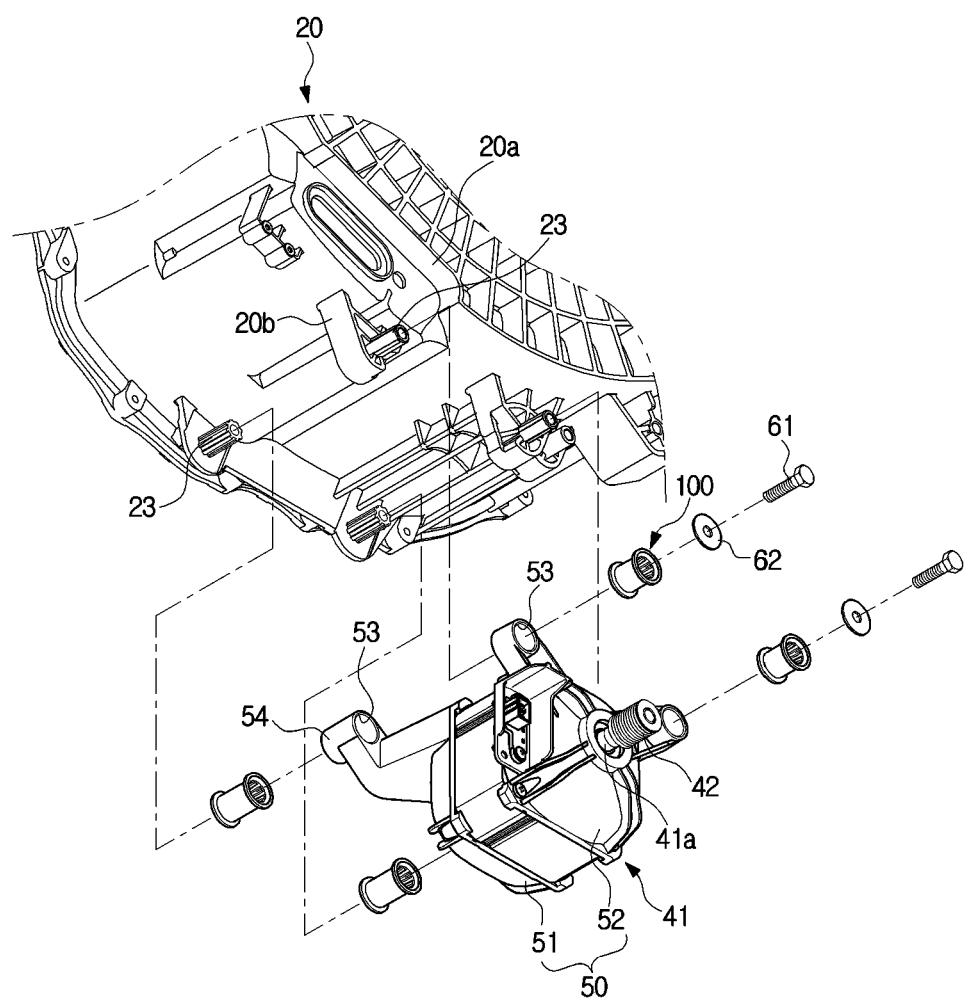
FIG. 3 is an exploded perspective view of a motor and an elastic member installed at a tub, according to an embodiment.
Figure 4:
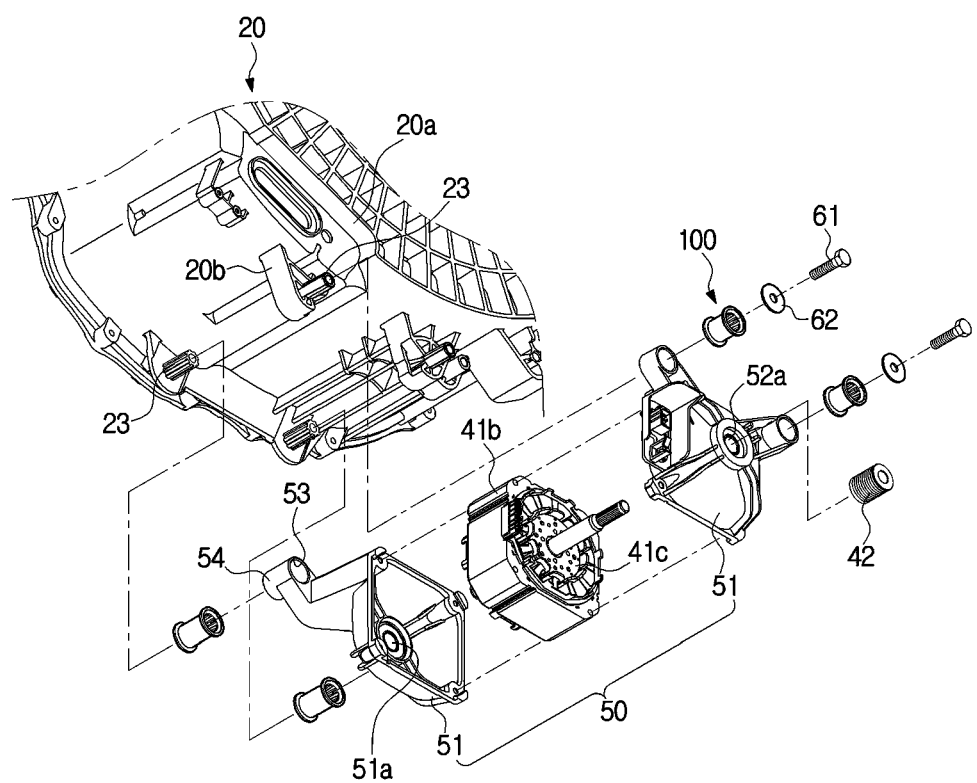
FIG. 4 is an exploded perspective view of a motor installed at a tub, according to an embodiment.

FIG. 1 shows a drum washing machine, according to an embodiment, FIG. 2 is a perspective view of a motor installed at a tub of a drum washing machine, according to an embodiment, FIG. 3 is an exploded perspective view of a motor and an elastic member installed at a tub, according to an embodiment, and FIG. 4 is an exploded perspective view of a motor installed at a tub, according to an embodiment.

As shown in FIGS. 1 to 4, a drum washing machine 1 includes a main body 10 forming an outer appearance, a tub 20 installed in the main body 10 and storing wash water during washing, and a drum 30 rotatably installed in the tub 20 and washing laundry.

A door 11 configured to open or close an opening for inputting laundry may be installed on the front surface or the upper surface of the main body 10.

A water supply pipe 12 and a detergent supply device 13 for supplying wash water and detergent to the tub 20 are installed inside the main body 10. The detergent supply device 13 has a receiving space for receiving the detergent therein and may be located on the front side of the main body 10 so that the user may easily input the detergent. A drain pump 14 and a drain pipe 15 for discharging the wash water contained in the tub 20 to the outside of the main body 10 are installed in the lower portion of the main body 10.

The drum 30 is formed in a hollow cylindrical shape, and a plurality of through holes 31 are formed in the outer circumferential surface of the drum 30 to allow wash water to pass therethrough. The drum 30 may be provided with a lifter (not shown) installed to wash the laundry by lifting the laundry to an upper portion of the drum 30 and dropping the laundry while the drum 30 is rotated.

A rotating shaft 21 is coupled to a rear surface of the drum 30 to rotate the drum 30 in the tub 20 by receiving a rotational force. The rotating shaft 21 is rotatably installed on the rear surface of the tub 20 and the rear end of the rotating shaft 21 penetrates the rear surface of the tub 20 and protrudes backward from the tub 20.

The drum washing machine 1 includes a driving device 40 that generates power to rotate the drum 30.

The driving device 40 includes a motor 41 for generating a rotational force, a driving pulley 42 installed on a motor shaft 41a of the motor 41, and a driven pulley 44 installed at the rear end of the rotating shaft 21 and receiving a rotational force from the driving pulley 42 through a belt 43.

Therefore, the rotational force of the motor 41 is transmitted to the drum 30 by the driving pulley 42 and the driven pulley 44 via the belt 43 to rotate the drum 30 clockwise or counterclockwise.

The motor 41 includes a stator 41b, a rotor 41c that is rotatably installed in the stator 41b and rotates interactively with the stator 41b, and a motor shaft 41a that is installed at the center of the rotor 41c and rotates together with the rotor 41c. The driving pulley 42 is installed at the rear end of the motor shaft 41a.

The motor 41 may include a motor bracket 50 which forms an outer appearance and is provided to support the stator 41b and the rotor 41c. The motor 41 may include a pair of bearings (not shown) installed in the motor bracket 50 to rotatably support opposite sides of the motor shaft 41a.

The motor bracket 50 may include a first motor bracket 51 and a second motor bracket 52. The first motor bracket 51 supports one side of the motor 41 and the second motor bracket 52 supports the opposite side of the motor 41. The motor bracket 50 may include at least one of a metal or a resin material.

The first motor bracket 51 is provided to enclose one side of the stator 41b and the second motor bracket 52 is provided to enclose the opposite side of the stator 41b. Shaft through holes 51a and 52a are formed in the center of the first motor bracket 51 and the second motor bracket 52 so that the motor shaft 41a may pass therethrough.

The motor 41 is disposed at the lower side of the tub 20. The motor 41 is fixed to the lower side of the outer surface 20a of the tub 20. A coupling part 23 protruding rearward to be fixed to the motor 41 may be provided on the lower side of the outer surface 20a of the tub 20. The coupling part 23 may be formed on a tub bracket 20b formed on the lower surface of the tub 20. Although the coupling part 23 for fixing the motor in the embodiment of the present disclosure is illustrated as extending rearward from the tub bracket 20b of the tub 20, the idea of the present disclosure is not limited thereto.

A tub fixing portion 54 is provided on the motor bracket 50 so as to fix the motor 41 to the tub 20. The tub fixing portion 54 may be formed at each of the first motor bracket 51 and the second motor bracket 52. The tub fixing portion 54 includes a fastening hole 53 into which the coupling part 23 of the tub 20 may be inserted.

Therefore, the coupling part 23 of the tub 20 is inserted into the fastening hole 53 of the motor bracket 50, and a fastening member 61 such as a bolt is inserted and fastened. A thread (not shown) is formed on the coupling part 23 so that the coupling member 61 may be fastened. The coupling member 61 may also be provided with a washer 62 for assisting in fastening.

An elastic member 100 for reducing vibrations and noise may be provided between the tub 20 and the motor bracket 50.

Figure 5:
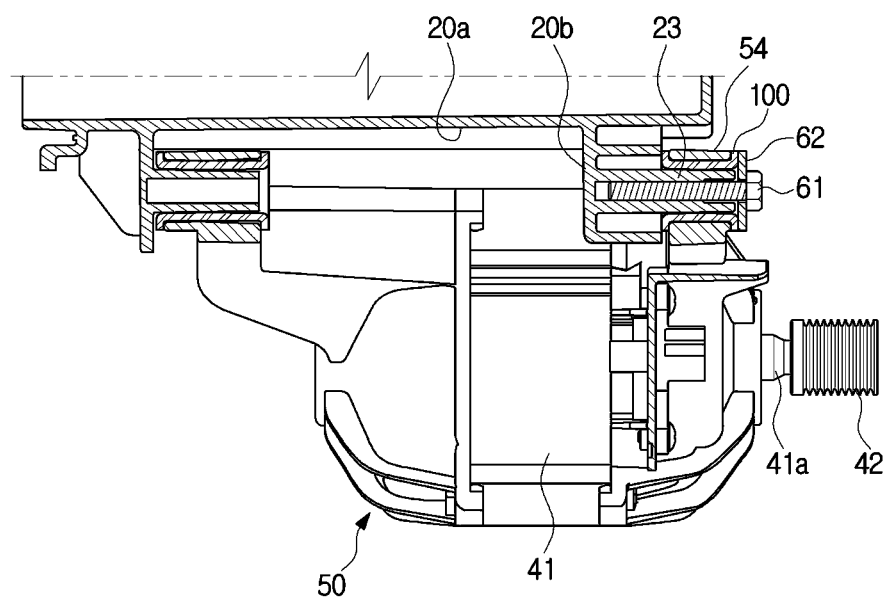
FIG. 5 is a partial cross-sectional view of an elastic member installed between a tub and a motor bracket, according to an embodiment.
Figure 6:
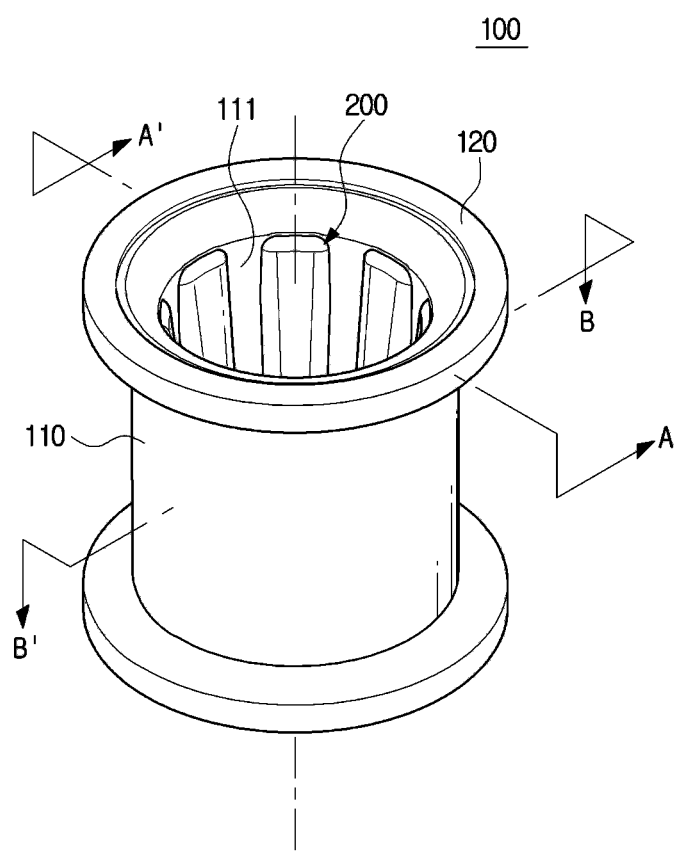
FIG. 6 is a perspective view of an elastic member, according to an embodiment.
Figure 7:
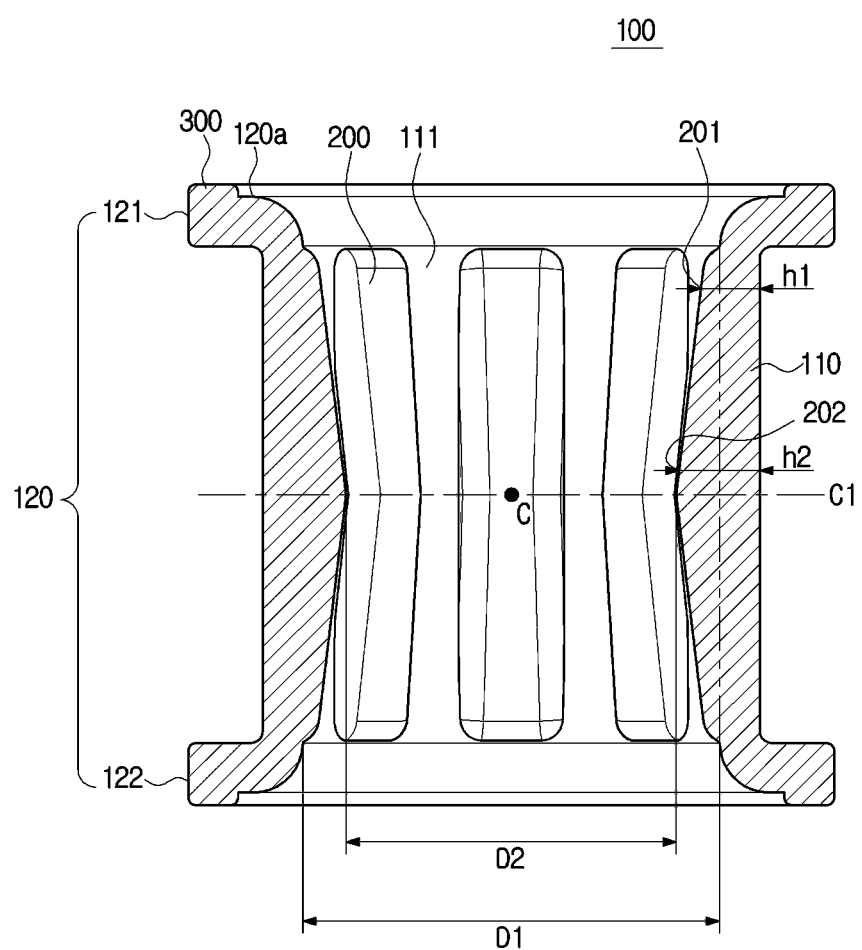
FIG. 7 is a cross-sectional view of the elastic member of FIG. 6 taken along the line A-A', according to an embodiment.
Figure 8:
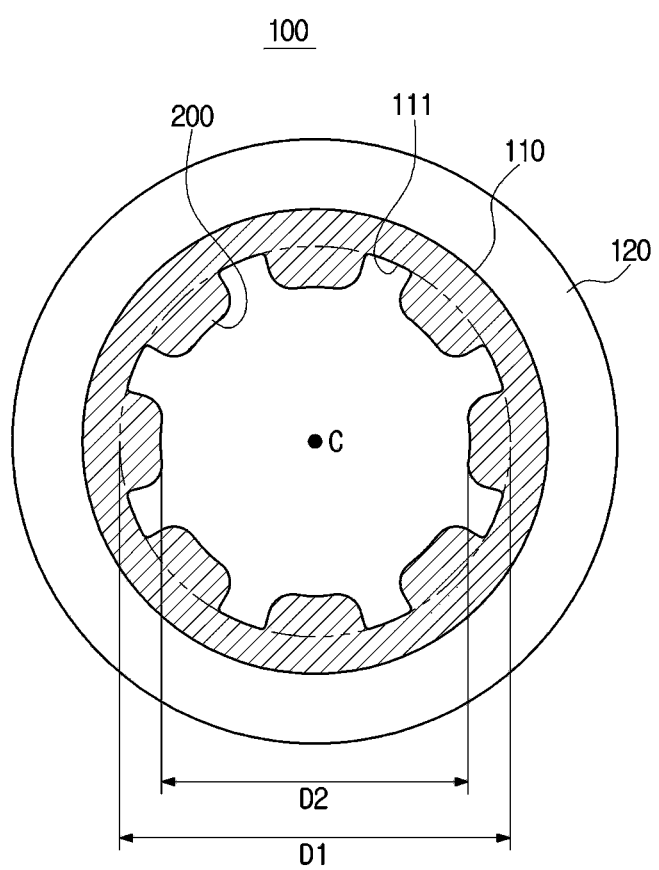
FIG. 8 is a cross-sectional view of the elastic member of FIG. 6 taken along the line B-B', according to an embodiment.

FIG. 5 is a partial cross-sectional view of an elastic member installed between a tub and a motor bracket, according to an embodiment, FIG. 6 is a perspective view of an elastic member, according to an embodiment, FIG. 7 is a cross-sectional view of the elastic member of FIG. 6 taken along the line A-A', according to an embodiment, and FIG. 8 is a cross-sectional view of the elastic member of FIG. 6 taken along the line B-B', according to an embodiment.

As shown in FIGS. 5 to 8, the elastic member 100 may be disposed between the tub 20 and the motor bracket 50.

The elastic member 100 is provided between the coupling part 23 of the tub 20 and the fastening hole 53 of the motor bracket 50 to reduce vibrations of the tub 20 and the motor 41. The elastic member 100 may include a rubber material.

The elastic member 100 includes a cylindrical body 110, a flange 120 protruding outward at each of opposite ends of the body 110, and a rib 200 protruding from the inner circumferential surface 111 of the body 110.

The flange 120 includes a first flange 121 provided at one end of the body 110 and a second flange 120 provided at an other end of the body 110. The flange 120 is formed to protrude outward from the center of the body 110.

The elastic member 100 has the form of a cylinder with center C and the inner circumferential surface of first diameter D1.

The rib 200 protrudes in the radial direction of the elastic member 100. The rib 200 may extend in the longitudinal direction of the body 110. The center C1 of the rib is located on the same line as the center C of the elastic member. The rib 200 may have a substantially hexagonal cross section.

There may be a plurality of ribs 200. The plurality of ribs 200 may be disposed symmetrically. The plurality of ribs 200 may be disposed to be apart from each other in the circumferential direction. At least two ribs 200 are formed to be symmetrical.

The rib 200 is formed to have height h. The height h of the rib 200 increases as it goes from one end of the rib 200 to the center C1. The height h of the rib 200 decreases as it goes from the center C of the elastic member 100 toward the outside of the elastic member 100.

Specifically, the rib 200 may include a first portion 201 and a second portion 202. The second portion 202 of the rib 200 is located to be closer to the center C1 of the rib than the first portion 201 is. The first portion 201 has first height h1 and the second portion 202 has second height h2. The second portion 202 of the rib 200 is formed to be closer to the center C of the elastic member than the first portion 201 is. The second height h2 of the rib 200 is formed to be closer to the center C of the elastic member than the first height h1 is.

The elastic member 100 may have first diameter D1 of the body 110 and second diameter D2 of at least a portion of the inner circumferential surface 111 of the body 110, which is reduced from the first diameter D1 by the rib 200 protruding inward.

The rib 200 of the elastic member 100 is disposed between the coupling part 23 of the tub 20 and the fastening hole 53 of the motor bracket 50 to insulate the vibrations and noise between the tub 20 and the motor bracket 50.

The elastic member 100 may include a protruding portion 300 protruding from the flange 120. The protruding portion 300 is formed in the circumferential direction on the edge of the upper surface of the flange 120. The protruding portion 300 is formed circumferentially around the upper surface of the flange 120. The protruding portion 300 of the flange 120 may have a rectangular cross section. The protruding portion 300 formed on the flange 120 of the elastic member 100 is disposed between the coupling part 23 of the tub 20 and the washer 62 to reduce vibrations. The protruding portion 300 is formed to reduce the vibration in the motor shaft direction due to the fastening of the coupling member 61 between the tub 20 and the washer 62.

Figure 9:
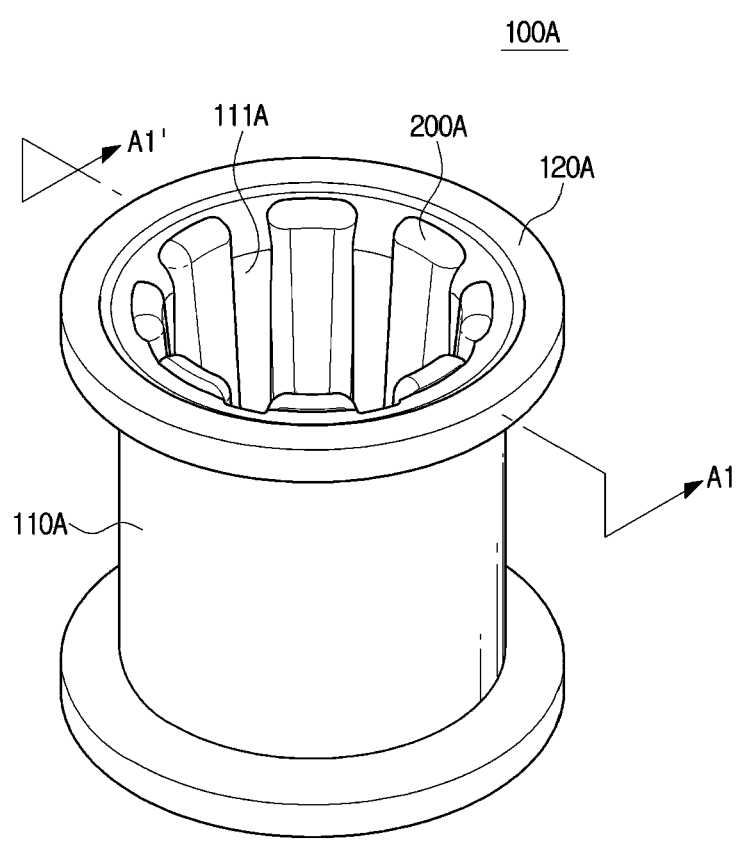
FIG. 9 is a perspective view of an elastic member, according to another embodiment.
Figure 10:
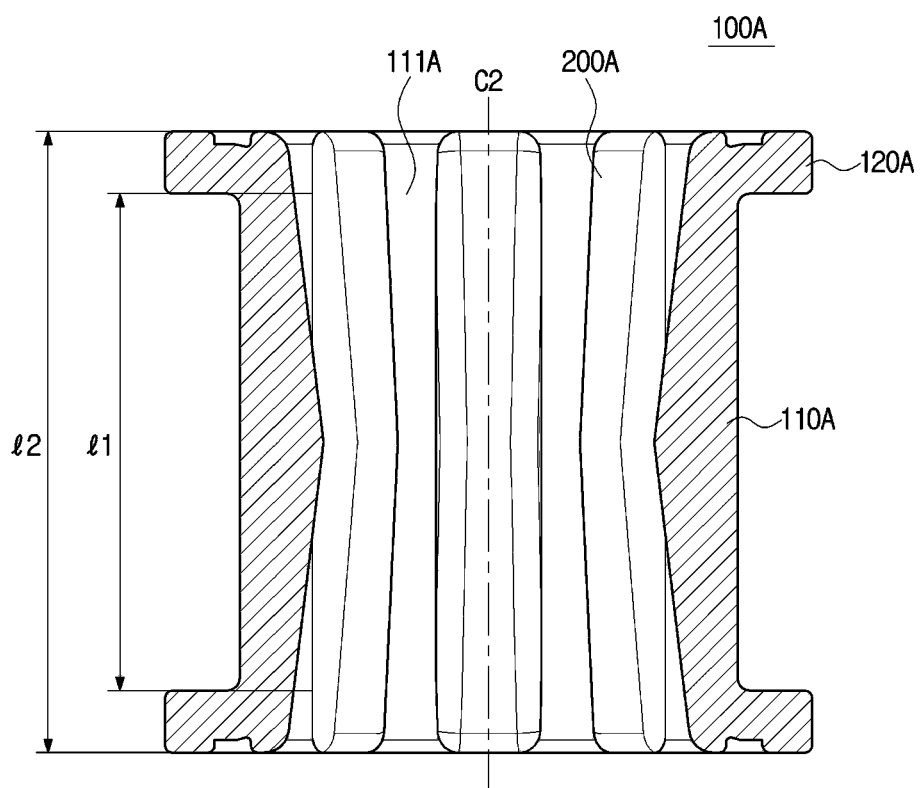
FIG. 10 is a cross-sectional view of the elastic member of FIG. 9 taken along the line A1-A1', according to another embodiment.

FIG. 9 is a perspective view of an elastic member, according to another embodiment, and FIG. 10 is a cross-sectional view of the elastic member of FIG. 9 taken along the line A1-A1', according to another embodiment. Reference numerals not shown in FIGS. 9 and 10 refer to those of FIGS. 1 to 7.

As shown in FIGS. 9 and 10, an elastic member 100A may be disposed between the tub 20 and the motor bracket 50.

The elastic member 100A includes a cylindrical body 110A, a flange 120A protruding outward at each of opposite ends of the body 110A, and a rib 200A protruding from the inner circumferential surface 111A of the body 110A in the radial direction of the elastic member 100A.

The flange 120A includes a first flange 121A provided at one end of the body 110A and a second flange 120A provided at an other end. The flange 120A is formed to protrude to the outside of the body 110A.

The body 11A of the elastic member 100A is formed in a cylindrical shape having first length 11, center C, and an inner circumferential surface 111A of the first diameter D1.

The rib 200A protrudes in the radial direction of the elastic member 100A. The rib 200A may extend in the longitudinal direction of the body 110A. The rib 200A may be formed to extend from at least a portion of the first flange 121A to at least a portion of the second flange 122A. Second length 12 of the rib 200A may be longer than the first length 11 of the body 110A. The center C1 of the rib is located on the same line as the center C of the elastic member. The elastic member 100A may include a plurality of ribs 200A formed in the second length 12 and extending to at least a portion of the flange 120A. The plurality of ribs 200A may be disposed symmetrically. The plurality of ribs 200A may be disposed to be spaced apart from each other in the circumferential direction.

The height h and the shape of the rib 200A of the elastic member 100A are the same as those of the previous embodiment.

The rib 200A of the elastic member 100A is disposed between the coupling part 23 of the tub 20 and the fastening hole 53 of the motor bracket 50 to insulate the vibration and the noise between the tub 20 and the motor bracket 50. The operation and effect of the rib 200A of the elastic member 100A having the above-described structure may be fully appreciated from the above-described contents, so the overlapping description will not be repeated.

Figure 11:
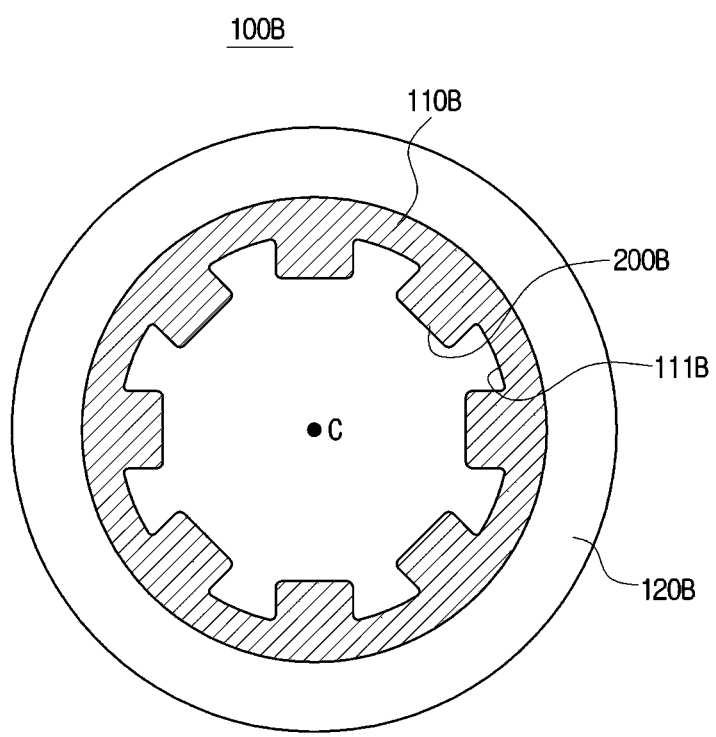
FIGS. 11 to 13 are cross-sectional views of an elastic member, according to another embodiment.
Figure 12:
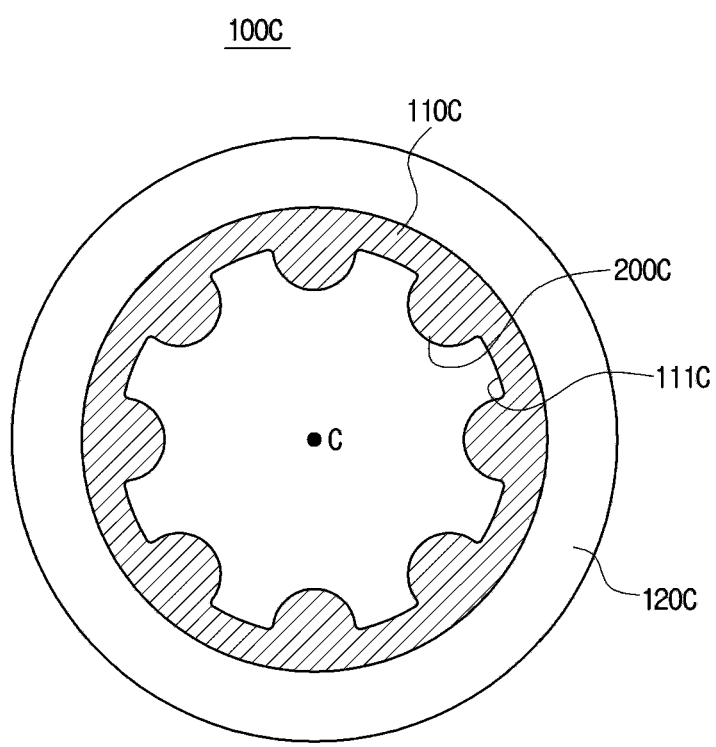
Figure 13:
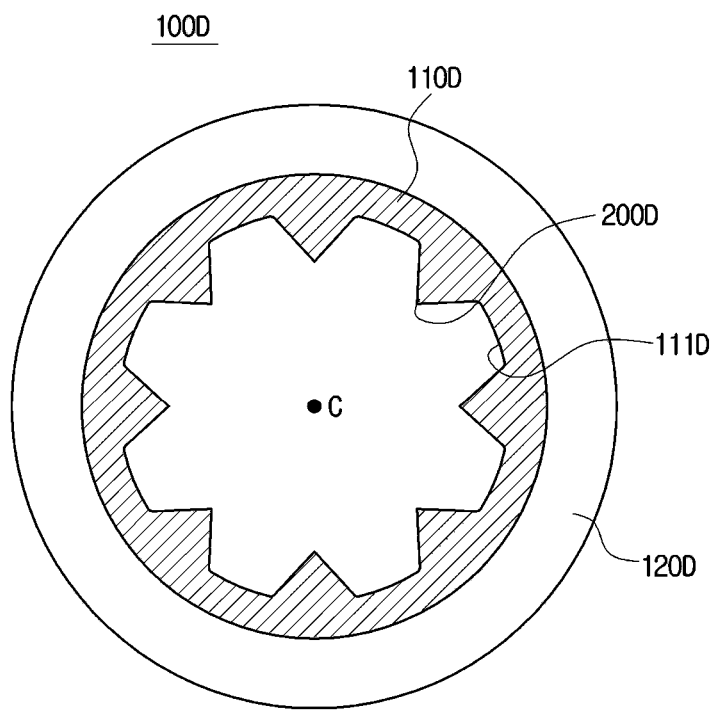

FIGS. 11 to 13 are cross-sectional views of an elastic member, according to another embodiment. Reference numerals not shown in FIGS. 11 to 13 refer to those of FIGS. 1 to 7.

As shown in FIG. 11, an elastic member 100B may be disposed between the tub 20 and the motor bracket 50.

The elastic member 100B includes a cylindrical body 110B, a flange 120B protruding outward at each of opposite ends of the body 11B, and a rib 200B protruding from the inner circumferential surface 111B of the body 110B in the radial direction of the elastic member 100B. The flange 120B is formed to protrude to the outside of the body 110B.

The rib 200B protrudes in the radial direction of the elastic member 100B. The rib 200B may extend in the longitudinal direction of the body 110B. The center C1 of the rib is located on the same line as the center C of the elastic member. The rib 200B may have a substantially rectangular cross section.

There may be a plurality of ribs 200B. The plurality of ribs 200B may be disposed symmetrically. The plurality of ribs 200B may be disposed to be apart from each other in the circumferential direction. At least two ribs 200B are formed to be symmetrical. The height h and the shape of the rib 200B are the same as described above.

The rib 200B of the elastic member 100B is disposed between the coupling part 23 of the tub 20 and the fastening hole 53 of the motor bracket 50 to insulate the vibration and the noise between the tub 20 and the motor bracket 50.

The operation and effect of the rib 200B of the elastic member 100B having the above-described structure may be fully appreciated from the above-described contents, so the overlapping description will not be repeated.

As shown in FIG. 12, an elastic member 100C may be disposed between the tub 20 and the motor bracket 50.

The elastic member 100C includes a cylindrical body 110B, a flange 120C protruding outward at each of opposite ends of the body 110C, and a rib 200C protruding from the inner circumferential surface 111C of the body 11C in the radial direction of the elastic member 100B. The flange 120C is formed to protrude to the outside of the body 110C.

The rib 200C protrudes in the radial direction of the elastic member 100C. The rib 200C may extend in the longitudinal direction of the body 110C. The center C1 of the rib is located on the same line as the center C of the elastic member. The rib 200C may have a substantially circular cross section.

There may be a plurality of ribs 200C, which may be disposed symmetrically. The plurality of ribs 200C may be disposed to be apart from each other in the circumferential direction. At least two ribs 200C are formed to be symmetrical. The height h and the shape of the rib 200C are the same as described above.

The rib 200C of the elastic member 100C is disposed between the coupling part 23 of the tub 20 and the fastening hole 53 of the motor bracket 50 to insulate the vibration and the noise between the tub 20 and the motor bracket 50.

The operation and effect of the rib 200C of the elastic member 100C having the above-described structure may be sufficiently predicted from the above-described contents, so the overlapping description will not be repeated.

As shown in FIG. 13, an elastic member 100D may be disposed between the tub 20 and the motor bracket 50.

The elastic member 100D includes a cylindrical body 110D, a flange 120D protruding outward at each of opposite ends of the body 11D, and a rib 200D protruding from the inner circumferential surface 111D of the body 11D in the radial direction of the elastic member 100B. The flange 120D is formed to protrude to the outside of the body 110D.

The rib 200D protrudes in the radial direction of the elastic member 100D. The rib 200D may extend in the longitudinal direction of the body 110D. The rib 200D may have a substantially triangular cross section.

There may be a plurality of ribs 200D, which may be disposed symmetrically. The plurality of ribs 200D may be disposed to be apart from each other in the circumferential direction. At least two ribs 200D are formed to be symmetrical. The height h and the shape of the rib 200D are the same as described above.

The rib 200D of the elastic member 100D is disposed between the tub 20 and the motor bracket 50 to insulate the vibration and the noise.

The operation and effect of the rib 200D of the elastic member 100D having the above-described structure may be sufficiently predicted from the above-described contents, so the overlapping description will not be repeated.

Figure 14:
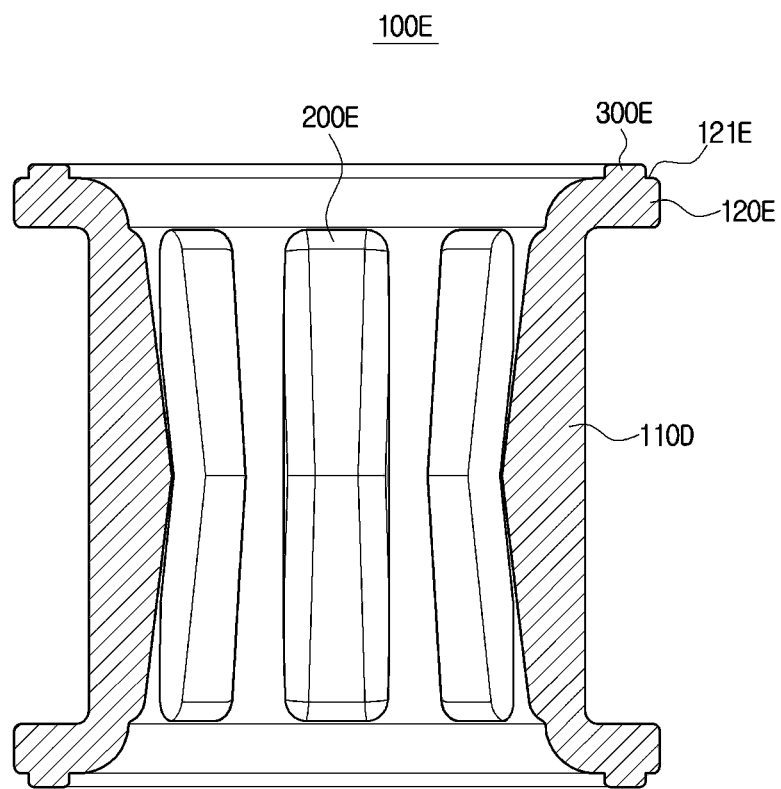
FIGS. 14 to 16 show an elastic member to which a protruding portion is applied, according to another embodiment.
Figure 15:
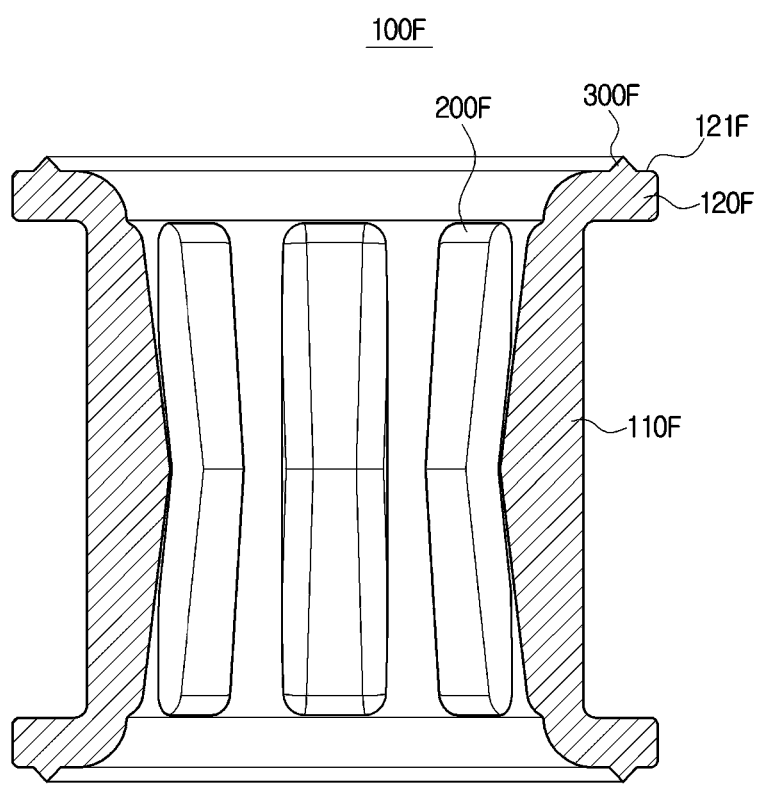
Figure 16:
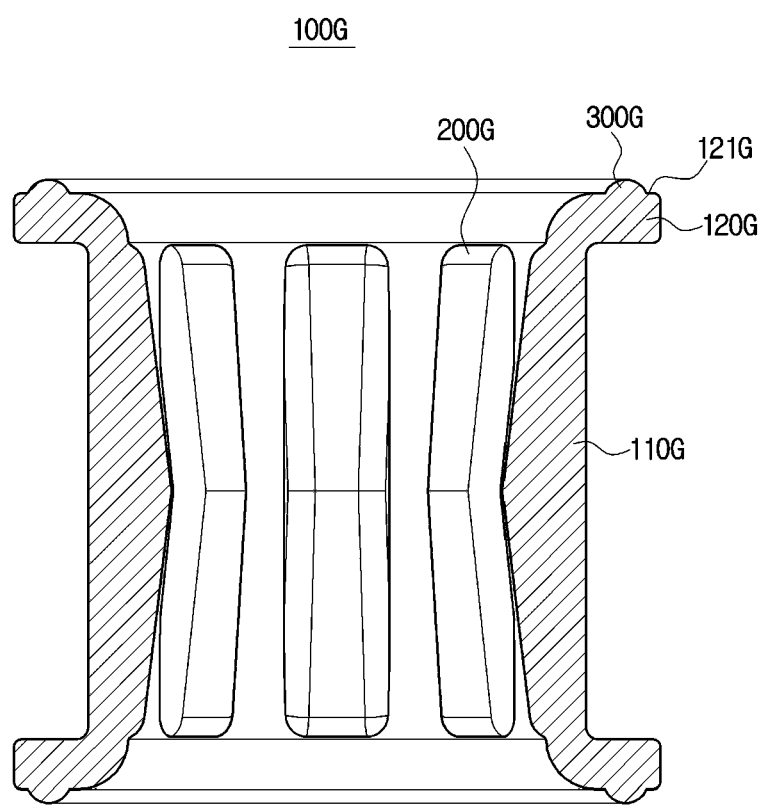

FIGS. 14 to 16 show an elastic member to which a protruding portion is applied, according to another embodiment. Reference numerals not shown in FIGS. 14 to 16 refer to FIGS. 1 to 7.

As shown in FIG. 14, an elastic member 100E includes a cylindrical body 110E and a flange 120E protruding outward at each of opposite ends of the body 110E.

The body 110E may be provided with a rib 200E protruding toward the center in the radial direction.

The elastic member 100E may include a protruding portion 300E protruding from the flange 120E. The protruding portion 300E is formed at a center portion of the upper surface 121E of the flange in a circumferential direction. The protruding portion 300E of the flange 120E may be formed in a ring shape. The cross section of the flange 120E may be formed in a rectangular shape.

The protruding portion 300E formed on the flange 120E of the elastic member 100E is disposed between the coupling part 23 of the tub 20 and the washer 62 to reduce vibrations. The protruding portion 300E is formed to reduce the vibration in the motor shaft direction due to the fastening of the coupling member 61 between the tub 20 and the washer 62.

The operation and effect of the protruding portion 300E of the elastic member 100E having the above-described structure may be fully appreciated from the above-described contents, so the overlapping description will not be repeated.

As shown in FIG. 15, an elastic member 100F includes a cylindrical body 110F and a flange 120F protruding outward at each of opposite ends of the body 110F.

The body 11F may be provided with a rib 200F protruding toward the center in the radial direction.

The elastic member 100F may include a protruding portion 300F protruding from the flange 120F. The protruding portion 300F is formed in a circumferential direction on the center of the upper surface 121F of the flange 120F. The cross section of the protruding portion 300F may be formed in a triangular shape.

The protruding portion 300F formed in a triangular shape on the flange 120F of the elastic member 100F is disposed between the coupling part 23 of the tub 20 and the washer 62 to reduce vibrations. The protruding portion 300F is formed to reduce the vibration in the motor shaft direction due to the fastening of the coupling member 61 between the tub 20 and the washer 62.

The operation and effect of the protruding portion 300F of the elastic member 100F having the above-described structure may be fully appreciated from the above-described contents, so the overlapping description will not be repeated.

As shown in FIG. 16, an elastic member 100G includes a cylindrical body 110G and a flange 120G protruding outward at each of opposite ends of the body 110G.

The body 110G may be provided with a rib 200G protruding toward the center in the radial direction.

The elastic member 100G may include a protruding portion 300G protruding from the flange 120G. The protruding portion 300G is formed in a center portion of the upper surface 121G of the flange 120G in the circumferential direction. The cross section of the protruding portion 300G may be formed in a circular shape.

The protruding portion 300G formed in the circular shape on the flange 120G of the elastic member 100G is disposed between the coupling part 23 of the tub 20 and the washer 62 to reduce vibrations. The protruding portion 300G is formed to reduce the vibration in the motor shaft direction due to the fastening of the coupling member 61 between the tub 20 and the washer 62.

The operation and effect of the protruding portion 300G of the elastic member 100G having the above-described structure may be fully appreciated from the above-described contents, so the overlapping description will not be repeated.

Although a few embodiments of the disclosure have been shown and described, it will be appreciated by those skilled in the art that changes may be made in these embodiments without departing from the principles and spirit of the disclosure, the scope of which is defined in the claims and their equivalents.

What is claimed is:

1. A drum washing machine comprising:
    a tub having a coupling part which protrudes in a rearward direction from a lower side of the tub;
    a drum rotatably installed in the tub;
    a motor bracket having a cylinder-shaped portion in which a fastening hole is formed, wherein the coupling part is inserted through the fastening hole; and
    an elastic member having a cylindrical shape and disposed between the fastening hole and the coupling part,
    wherein the elastic member comprises a rib protruding in a radial direction of the elastic member from an inner circumferential surface of the elastic member, and the rib has a protruding length that is largest at a center of the elastic member in a longitudinal direction of the elastic member.

2. The drum washing machine of claim 1, wherein an outer circumferential surface of the elastic member is configured to contact an inner surface of the fastening hole.

3. The drum washing machine of claim 1, wherein the protruding length of the rib decreases from the center of the elastic member as being directed toward an end of the elastic member.

4. The drum washing machine of claim 1, wherein the rib comprises a plurality of ribs, and at least two of the plurality of ribs each have a protruding length that increases in the radial direction of the elastic member as being directed toward the center of the elastic member.

5. The drum washing machine of claim 4, wherein the plurality of ribs are disposed to be spaced apart from each other in the circumferential direction.

6. The drum washing machine of claim 1, wherein the rib comprises at least one shape of a circle, a rhombus, a rectangle, and a trapezoid.

7. The drum washing machine of claim 1, wherein the elastic member comprises:
    a body;
    a flange protruding in an outer direction from each of opposite ends of the body; and
    a protruding portion protruding from the flange.

8. The drum washing machine of claim 7, wherein the protruding portion is formed in a circumferential direction at edges of the flange.

9. The drum washing machine of claim 1, wherein
    the protruding length of the rib in the radial direction continuously decreases in the longitudinal direction away from the center of the elastic member to a first end portion of the elastic member, and
    the protruding length of the rib in the radial direction continuously decreases in the longitudinal direction away from the center of the elastic member to a second end portion of the elastic member, opposite of the first end of the elastic member.

10. A drum washing machine includes:
    a tub;
    a drum rotatably installed in the tub;
    a motor bracket configured to fix a motor to the tub; and
    an elastic member provided between the tub and the motor bracket,
    wherein an inner circumferential surface of the elastic member has a diameter which continuously decreases from a first end of the elastic member to a center of the elastic member, and which continuously decreases from a second end of the elastic member, opposite of the first end, to the center of the elastic member.

11. The drum washing machine of claim 10, wherein the elastic member includes a cylindrical body and a flange formed at an edge of both ends of the body, and the flange includes a protruding portion protruding from the flange.

12. The drum washing machine of claim 11, wherein the protruding portion is formed in a circumferential direction on an upper surface of the flange.

13. The drum washing machine of claim 11, wherein the protruding portion includes a section having at least one shape of a circle, a rhombus, a rectangle, and a trapezoid.

14. The drum washing machine of claim 10, wherein
the tub includes a tub bracket disposed on a lower surface of the tub, and
a coupling part which protrudes in a rearward direction from a rear surface of the tub bracket,
the motor bracket includes a cylinder-shaped portion in which a fastening hole is formed,
the coupling part is inserted through the cylinder-shaped portion, and
the elastic member is disposed between the fastening hole and the coupling part.

15. The drum washing machine of claim 14, wherein an outer circumferential surface of the elastic member is in contact with an inner surface of the fastening hole.

* * * * *